United States Patent
Watson

(10) Patent No.: US 10,148,691 B2
(45) Date of Patent: Dec. 4, 2018

(54) DETECTION OF UNWANTED ELECTRONIC DEVICES TO PROVIDE, AMONG OTHER THINGS, INTERNET OF THINGS (IOT) SECURITY

(71) Applicant: Fortinet, Inc., Sunnyvale, CA (US)

(72) Inventor: Bryan K. Watson, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/396,508

(22) Filed: Dec. 31, 2016

(65) Prior Publication Data
US 2018/0191775 A1 Jul. 5, 2018

(51) Int. Cl.
| H04L 29/06 | (2006.01) |
| H04L 29/08 | (2006.01) |
| H04W 12/12 | (2009.01) |
| G06N 99/00 | (2010.01) |

(52) U.S. Cl.
CPC ....... *H04L 63/1475* (2013.01); *G06N 99/005* (2013.01); *H04L 63/1483* (2013.01); *H04L 67/12* (2013.01); *H04W 12/12* (2013.01)

(58) Field of Classification Search
CPC . H04L 63/1475; H04L 67/12; H04L 63/1483; G06N 99/005; H04W 12/12
See application file for complete search history.

(56) References Cited

U.S. PATENT DOCUMENTS

| 7,459,898 B1 * | 12/2008 | Woodings | G01R 23/16 |
| | | | 324/76.19 |
| 9,374,672 B1 * | 6/2016 | Chao | H04W 4/029 |
| 9,609,500 B2 * | 3/2017 | Noonan | H04W 8/005 |
| 9,736,175 B2 * | 8/2017 | Baxley | H04W 4/90 |
| 2001/0022558 A1 * | 9/2001 | Karr, Jr. | G01S 1/026 |
| | | | 342/450 |
| 2006/0232472 A1 * | 10/2006 | Roslak | G01S 5/0252 |
| | | | 342/457 |
| 2007/0173199 A1 * | 7/2007 | Sinha | H04W 12/12 |
| | | | 455/67.11 |
| 2007/0264939 A1 * | 11/2007 | Sugar | H04B 17/309 |
| | | | 455/67.11 |

(Continued)

OTHER PUBLICATIONS

Rayanchu, Shravan et al., "Airshark: Detecting Non-WiFi RF Devices using Commodity WiFi Hardware", IMC'11, Nov. 2-4, 2011, Berlin, Germany, 14 pages (Year: 2011).*

(Continued)

*Primary Examiner* — Michael Pyzocha
(74) *Attorney, Agent, or Firm* — Hamilton, DeSanctis & Cha LLP

(57) ABSTRACT

Systems and methods for detection of undesired/unwanted electronic devices are provided. According to one embodiment, a spectral signature of an electronic device is received by a sensing device configured to detect presence of an unwanted electronic device in proximity to an electronic device environment. The received spectral signature is matched against multiple stored spectral signatures of one or more electronic devices associated with the electronic device environment. When the received spectral signature does not match any of the multiple stored spectral signatures, then the electronic device is classified as an unwanted electronic device.

15 Claims, 10 Drawing Sheets

(56) References Cited

U.S. PATENT DOCUMENTS

| | | | | |
|---|---|---|---|---|
| 2010/0050259 | A1* | 2/2010 | Christofferson | H04H 20/12 726/23 |
| 2015/0092574 | A1* | 4/2015 | Kuan | H04W 12/12 370/252 |
| 2015/0382217 | A1* | 12/2015 | Odio Vivi | H04B 17/336 370/252 |
| 2016/0124041 | A1* | 5/2016 | Pathak | G01R 29/08 324/629 |
| 2016/0301434 | A1* | 10/2016 | Botchway | H04B 1/10 |
| 2017/0180984 | A1* | 6/2017 | Thomas | H04W 12/02 |
| 2017/0193797 | A1* | 7/2017 | Gschwind | G08B 21/24 |
| 2017/0237484 | A1* | 8/2017 | Heath | H04B 10/07953 398/26 |
| 2017/0280460 | A1* | 9/2017 | Emmanuel | H04L 1/0003 |
| 2017/0303094 | A1* | 10/2017 | Collar | H04L 41/069 |
| 2018/0027518 | A1* | 1/2018 | Sugumaran | H04W 64/00 370/328 |

OTHER PUBLICATIONS

Berg, A, "How to Perform a Bug Sweep." SearchSecurity.com. http://searchsecurity.techtarget.com/tip/How-to-perform-a-bug-sweep?vgnextfmt=print. 2 pgs.

\* cited by examiner

DETECTION OF UNWANTED ELECTRONIC DEVICES TO PROVIDE, AMONG OTHER THINGS, INTERNET OF THINGS (IOT) SECURITY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2016, Fortinet, Inc.

BACKGROUND

Field

Embodiments of the present invention generally relate to detection of undesired/unwanted electronic devices. In particular, embodiments of the present invention relate to systems, devices, and methods for detection and location determination of undesired/unwanted electronic devices in order to protect against out-of-band data extrusion (data exfiltration) that may be accomplished through the use of such electronic devices.

Description of the Related Art

Network security is the process of taking physical and/or software preventative measures to protect underlying networking infrastructure and end points from, among other things, unauthorized access, misuse or improper disclosure, thereby creating a secure environment through which end users (e.g., consumers) have confidence in initiating financial transactions and the like.

Current network infrastructures are capable of detecting various data/network anomalies, intrusions and in-band data extrusions; however, there is presently no way to detect out-of-band data extrusion that may be accomplished via parasitic/undesired/unwanted electronic devices. In computer networking, out-of-band data generally refers to data transferred through a communication channel or stream that is independent from the main in-band data stream. An out-of-band data mechanism provides a conceptually independent channel that allows data sent via that mechanism to be kept separate from in-band data. For example, rogue cameras, audio recording devices, overlay keypads/keyboards, credit card skimmers, passive sniffing devices and the like pose real threats to industry, governments, and individuals while the use of these devices is becoming more sophisticated and prevalent. Whether attached to an existing piece of electronics, such as Automated Teller Machines (ATMs), gas pumps, parking meters, parking lot kiosks, vending machines and other payment terminals and/or card readers associated therewith, or set inside a building, such as a camera in a fitting room or a recording device in a boardroom, these devices are unwanted and intrusive. When attached to computers, passive sniffing devices may gather sensitive information, e.g., account information encoded on the magnetic stripe of a credit card, and perform out-of-band data exfiltration via a Bluetooth connection, for example, and remain undetected by modern Intrusion Detection Systems (IDS) and Data Leak (Loss) Prevention (DLP) systems.

Extrusion detection or outbound intrusion detection is a branch of intrusion detection aimed at developing mechanisms to identify successful and unsuccessful attempts to use the resources of a computer system to compromise other systems. Extrusion detection techniques focus primarily on analysis of system activity and outbound traffic (i.e., in-band traffic transmitted by the system) in order to detect malicious users, malware or network traffic that may pose a threat to the security of neighboring systems. While intrusion detection is mostly concerned about identification of incoming attacks (intrusion attempts), extrusion detection systems try to prevent attacks from being launched in the first place. They implement monitoring controls at leaf nodes of the network rather than concentrating them at choke points, e.g., routers—in order to distribute the inspection workload and to take advantage of the visibility a system has of its own state. The ultimate goal of extrusion detection is to identify attack attempts launched from an already compromised system in order to prevent them from reaching their target, thereby containing the impact of the threat.

As parasitic electronic devices performing out-of-band data extrusion (data exfiltration) located near, attached to or embedded within an authentic payment terminal or the like may pose a real threat to the basic components of network security, such as confidentiality, integrity and availability, there exists a need for parasitic electronic device detection methods and systems.

SUMMARY

Systems and methods are described for detection of undesired/unwanted electronic devices. According to one embodiment, a spectral signature of an electronic device is received by a sensing device configured to detect presence of an unwanted electronic device in proximity to an electronic device environment. The received spectral signature is matched against multiple stored spectral signatures of one or more electronic devices associated with the electronic device environment. When the received spectral signature does not match any of the multiple stored spectral signatures, then the electronic device is classified as an unwanted electronic device.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
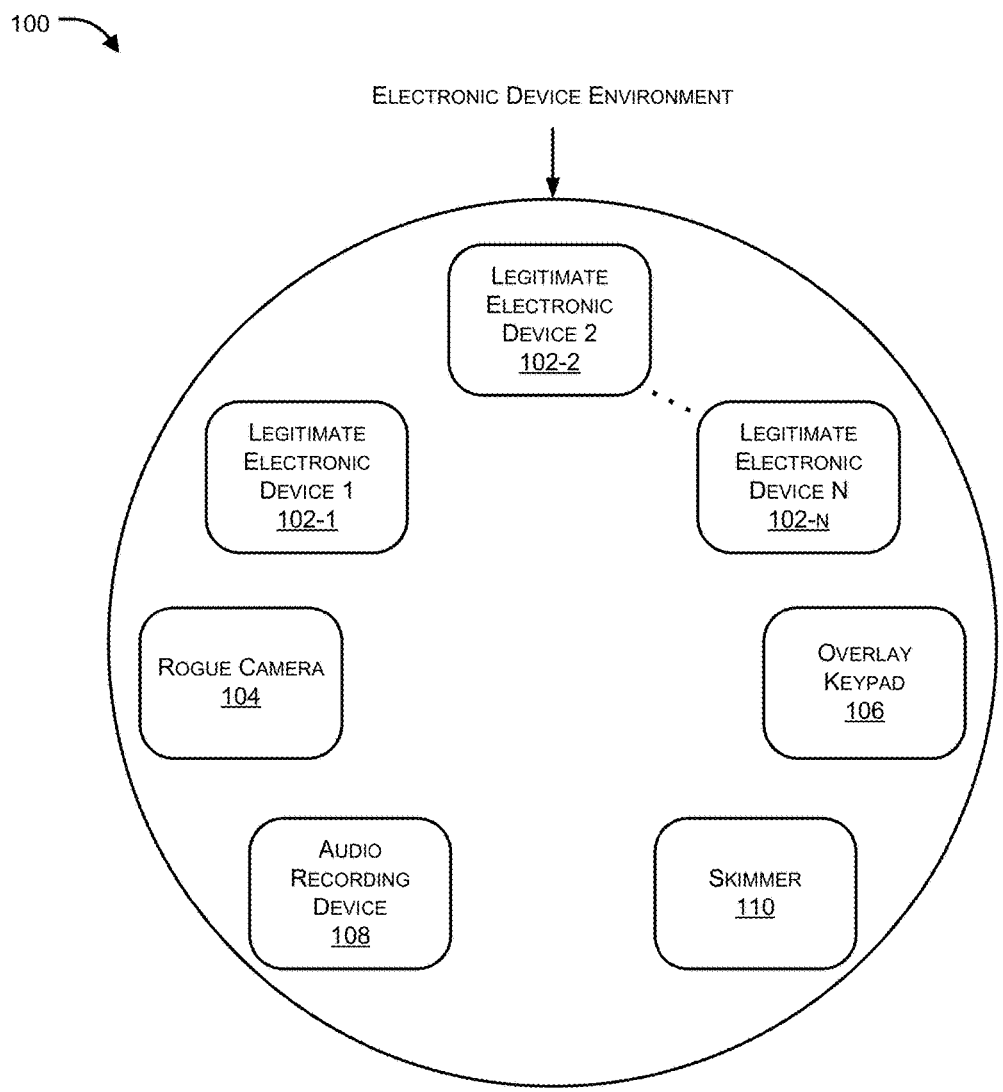
FIG. 1 illustrates an exemplary environment (e.g., an IoT environment) having multiple electronic devices (EDs) including legitimate electronic devices (LEDs) and parasitic electronic devices (PEDs) in which or with which embodiments of the present invention can be implemented.

Systems and methods are described for detection of undesired/unwanted electronic devices. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of detecting unwanted/undesired (also interchangeably referred to as parasitic) electronic devices, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present invention generally relate to detection of undesired/unwanted electronic devices. In particular, embodiments of the present invention relate to systems, devices, and methods for detection and location determination of undesired/unwanted electronic devices in order to protect against "out-of-band" data extrusion that may be accomplished via such electronic devices.

In an aspect, the present disclosure relates to a method comprising the steps of receiving, at a sensing device configured to detect presence of an unwanted electronic device, spectral signature of at least one electronic device; matching, using a database operatively coupled with the sensing device and storing a plurality of spectral signatures of one or more electronic devices, the received spectral signature of the at least one electronic device with the plurality of stored spectral signatures; and classifying, using the sensing device, the at least one electronic device as the unwanted electronic device when the received spectral signature does not match with the plurality of stored spectral signatures.

In an aspect, the sensing device can be any or a combination of a sensor, a computing device comprising the sensor, a vibration/audio detector, a noise detector, a capacitive detector, an inductive detector, a resistive detector, a photon/light spectrum detector, a software defined radio (SDR) detector, a radio frequency detector, a spectrum analyzer, a radio spectrum detector, a network security device, and an access point.

In another aspect, the unwanted electronic device can be any or a combination of a skimmer, a passive sniffing device, an overlap keypad, a rogue computing device, a rogue video recording device, and a rogue audio recording device.

In another aspect, the present disclosure relates to a method comprising the steps of receiving, at a sensing device configured to detect presence of an unwanted electronic device, behavior of at least one electronic device; matching, using a database operatively coupled with the sensing device and storing a plurality of normal behavior patterns of one or more electronic devices, the received behavior of the at least one electronic device with the plurality of stored normal behavior patterns; and classifying, using the sensing device, the at least one electronic device as the unwanted electronic device when the received behavior does not match with the plurality of stored normal behavior patterns.

In an aspect, the behavior of at least one electronic device can be obtained based on any or a combination of operation of the at least one electronic device, noise generated by the at least one electronic device, radio frequency generated by the at least one electronic device, electromagnetic interference generated by the at least one electronic device, effect created by the at least one electronic device on at least a second electronic device that it is in proximity of, and physical persistence of the at least one electronic device.

In another aspect, the present disclosure further relates to a method comprising the steps of receiving, at a sensing device configured to detect presence of an unwanted electronic device, a signal representative of spectral or RF characteristics of a electronic device environment having one or more electronic devices in proximity to the sensing device; processing and evaluating, at the sensing device, the received signal to determine if the spectral or RF characteristics are indicative of normal spectral or RF characteristics of the electronic device environment; and confirming, at the sensing device, that the electronic device environment comprises an unwanted electronic device when it is determined that the spectral or RF characteristics are not indicative of the normal spectral or RF characteristics of the electronic device environment.

In an aspect, the method can further include the step of analyzing the spectral or RF characteristics of the received signal to determine and locate the unwanted electronic device that is causing deviation from the normal spectral or RF characteristics of the electronic device environment. In an aspect, the spectral or RF characteristics of the determined unwanted electronic device can be learned by the sensing device such that when similar spectral or RF characteristics are subsequently detected, the sensing device identifies presence of corresponding unwanted electronic device. In another aspect, the sensing device can be configured to detect persistent presence of the unwanted electronic device that was not present when the electronic device environment had the normal spectral or RF characteristics. In yet another aspect, the normal spectral or RF characteristics of the electronic device environment can be constructed and updated based on learning of how the spectral or RF behavior of the each of the desired one or more electronic devices change over a period of time. The normal spectral or RF characteristics can be represented as one or more patterns that are indicative of the electronic device environment not comprising the unwanted electronic device.

In an aspect, the one or more patterns can be stored in the form of a plurality of libraries.

The present disclosure further relates to a system for detecting presence of an unwanted electronic device comprising a non-transitory storage device having embodied therein one or more routines operable to facilitate detection of the unwanted electronic device; and one or more processors coupled to the non-transitory storage device and operable to execute the one or more routines, wherein the one or more routines include: a spectral signature receive module, which when executed by the one or more processors, receives spectral signature of at least one electronic device; a spectral signature based matching module, which when executed by the one or more processors, matches, using a database storing a plurality of spectral signatures of one or more electronic devices, the received spectral signature of the at least one electronic device with the plurality of stored spectral signatures; and an unwanted electronic device classification module, which when executed by the one or more processors, classifies the at least one electronic device as the unwanted electronic device when the received spectral signature does not match with the plurality of stored spectral signatures.

The present disclosure further relates to a system for detecting presence of an unwanted electronic device comprising a non-transitory storage device having embodied therein one or more routines operable to facilitate detection of the unwanted electronic device; and one or more processors coupled to the non-transitory storage device and operable to execute the one or more routines, wherein the one or more routines include: a behavior receive module, which when executed by the one or more processors, receives behavior of at least one electronic device; a behavior based matching module, which when executed by the one or more processors, matches, using a database storing a plurality of normal behavior patterns of one or more electronic devices, the received behavior of the at least one electronic device with the plurality of stored normal behavior patterns; and an unwanted electronic device classification module, which when executed by the one or more processors, classifies the at least one electronic device as the unwanted electronic device when the received behavior does not match with the plurality of stored normal behavior patterns.

The present disclosure further relates to a system for detecting presence of an unwanted electronic device comprising a non-transitory storage device having embodied therein one or more routines operable to facilitate detection of the unwanted electronic device; and one or more processors coupled to the non-transitory storage device and operable to execute the one or more routines, wherein the one or more routines include: a spectral/RF characteristics based signal receive module, which when executed by the one or more processors, receives a signal that is representative of spectral or RF characteristics of an electronic device environment having one or more electronic devices; a spectral/RF characteristics signal processing module, which when executed by the one or more processors, processes and evaluates the received signal to determine if the spectral or RF characteristics are indicative of normal spectral or RF characteristics of the electronic device environment; and an unwanted device presence confirmation module, which when executed by the one or more processors, confirms that the electronic device environment comprises an unwanted electronic device when it is determined that the spectral or RF characteristics are not indicative of the normal spectral or RF characteristics of the electronic device environment.

Terminology

Brief definitions of terms used throughout this application are given below.

If the specification states a component or feature "may", "can", "could", or "might" be included or have a characteristic, that particular component or feature is not required to be included or have the characteristic.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The term "spectral signature" generally refers to a collection of spectral characteristics of an electronic device. Non-limiting examples of spectral characteristics include information regarding noise generated by the electronic device, one or more radio frequencies generated by the electronic device, electromagnetic interference (EI) generated by the electronic device and wireless protocols used by the electronic device.

FIG. 1 illustrates an exemplary electronic device environment 100 having multiple electronic devices (EDs) including legitimate electronic devices (LEDs) 102 and parasitic electronic devices (PEDs) in which or with which embodiments of the present invention can be implemented. As shown, an electronic device environment 100, which could represent a customer-facing portion of a network or system that facilitates transactions (e.g., deposit or withdrawal of money via a bank ATM, purchase of goods or services via a vending machine, purchase of gasoline via a gas pump and the like) or an IoT environment, can include one or more LEDs 102 such as laptop(s), mobile phone(s), smart phone(s), Personal Computer(s), tablet PC(s), point of sale device(s), among other authorized/authenticated/legitimate computing devices that can either function independently or can be communicatively coupled to each other or to one or more external/internal networks such as the Internet, a wired or wireless Local Area Network (LAN) or a Wide Area Network (WAN). Such an environment 100 can further include one or more PEDs (e.g., a rogue camera 104, an overlay keypad 106, an audio recording device 108, a passive sniffing device (not shown), and a skimmer 110, among other like devices that are illegitimate or undesired or installed with the purpose of conducting an undesired/unlawful activity. Such PEDs (which may also interchangeably be referred to herein as undesired or unrequired electronic devices) may be configured to intercept information associated with the transaction at issue and perform out-of-band data extrusion (data exfiltration). As such, it is desirable to have the ability to detect and report such PEDs to an authorized/appropriate person/team/network element in order to ensure that the network and LEDs and their operation is safe and secure. PEDs may be of different types and may operate in different manners. For instance, an ATM skimmer or Gas Pump card-reader skimmer works differently than a rogue image capturing device (e.g., a video camera) or a rogue audio recording device.

Figure 2A:
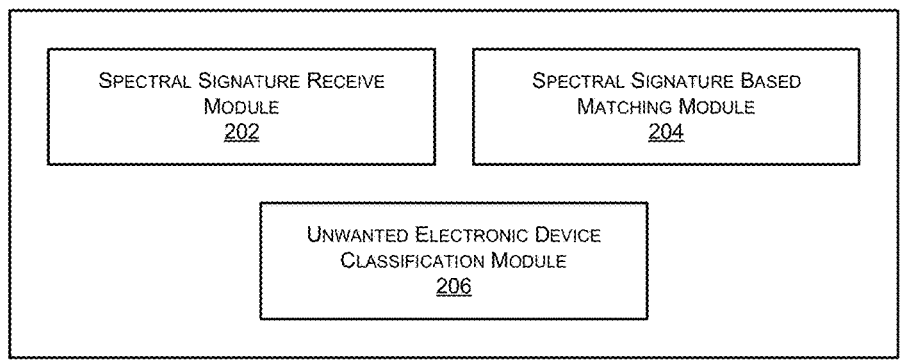
FIGS. 2A, 2B, and 2C illustrate exemplary module diagrams for detection of PEDs in an electronic device environment by means of a sensing/monitoring device in accordance with an embodiment of the present invention.
Figure 2B:
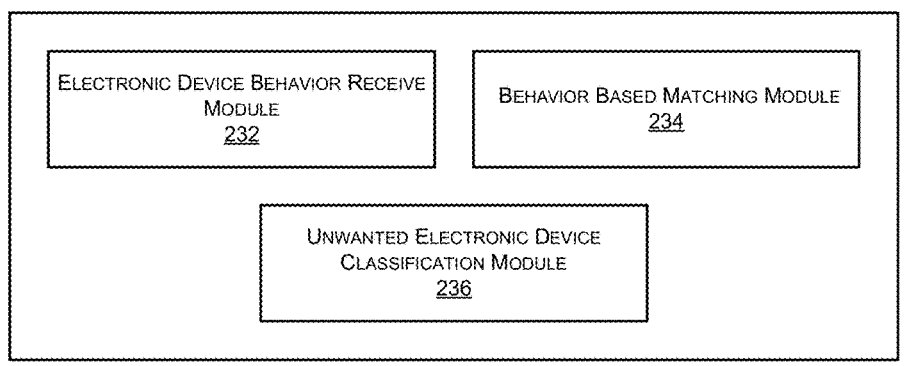
Figure 2C:
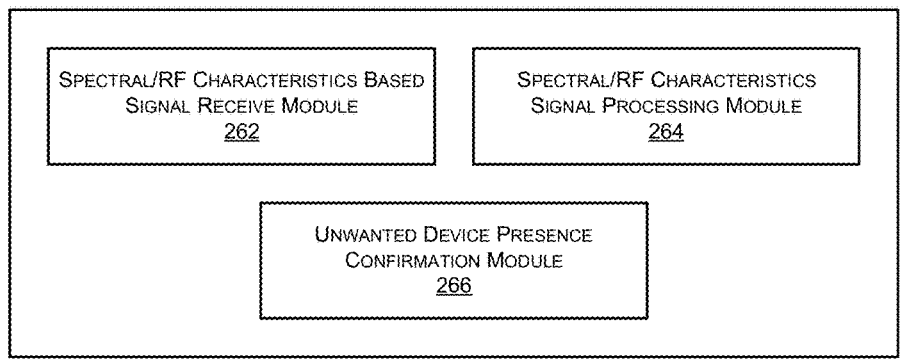

FIGS. 2A, 2B, and 2C illustrate exemplary module diagrams 200, 230, and 260 for detection of PEDs in an electronic device environment by means of a sensing/monitoring device in accordance with various embodiment of the present invention. The sensing/monitoring device may be any or a combination of a sensor, a computing device comprising a sensor, a vibration/audio detector, a noise detector, a capacitive detector, an inductive detector, a resistive detector, a photon/light spectrum detector, a software defined radio (SDR) detector, a radio frequency (RF) detector, a spectrum analyzer, a radio spectrum detector, a network security device, and an access point. Systems 200, 230 and 260 may represent standalone PED detection systems or may be integrated within existing network security infrastructure/devices.

In the context of the example illustrated by FIG. 2A, system 200 has embodied therein one or more routines operable to facilitate detection of an unwanted electronic device. System 200 can include one or more processors coupled to a non-transitory storage device and operable to execute the one or more routines, wherein the one or more routines can include a spectral signature receive module 202, which when executed by the one or more processors, receives a spectral signature of at least one electronic device. System 200 can further include a spectral signature based matching module 204, which when executed by the one or more processors, matches, using a local or remote database storing multiple spectral signatures of one or more electronic devices, the received spectral signature of the at least one electronic device with the stored spectral signatures. System 200 can further include an unwanted electronic device classification module 206, which when executed by the one or more processors, classifies the at least one electronic device as an unwanted electronic device when the received spectral signature matches one of the stored spectral signatures (or does not match any of the stored spectral signatures—depending upon whether the stored spectral signatures represent baseline spectral signatures or spectral signatures of known unwanted electronic devices).

Spectral signature receive module 202 can be configured to receive from the sensing device a spectral signature of at least one electronic device within range of system 200. A spectral signature of an electronic device can indicate spectral characteristic of the device, which can be unique for each device. In an example, a spectral signature can be an impedance value of a communication wire, or can be derived from timing information associated with recorded data such as zero crossing or jitter information.

Spectral signature based matching module 204 can be configured to match, using a database that is operatively coupled with system 200 and which stores multiple spectral signatures of one or more electronic devices, the received spectral signature of the at least one electronic device with the stored spectral signatures. Depending upon the particular implementation, stored spectral signatures can pertain to spectral signatures (SSs) of LEDs or known PEDs.

Unwanted electronic device classification module 206 can be configured to classify the at least one electronic device as an unwanted electronic device when the received spectral signature has a predefined relationship (e.g., matches one or more of the stored spectral signatures or does not match any of the stored spectral signatures). For example, when the database includes SSs for LEDs, the electronic device can be classified as an unwanted device when the SS of the electronic device is found not to match any of the SSs stored in the database. Alternatively, when the database includes SSs for known PEDs, the electronic device can be classified as an unwanted device when the SS of the electronic device is found to match one of the SSs stored in the database.

As mentioned above, non-limiting examples of unwanted electronic devices include any or a combination of a skimmer, a passive sniffing device, an overlap keypad, a rogue computing device, a rogue video recording device, and a rogue audio recording device.

With respect to FIG. 2B, system 230 can include an electronic device behavior receive module 232 that is configured to receive behavior of at least one electronic device; a behavior based matching module 234 that can be configured to match, using a database storing multiple normal and/or abnormal behavior patterns of one or more electronic devices, the received behavior of the at least one electronic device with the stored behavior patterns; and an unwanted electronic device classification module 236, which when executed by the one or more processors, classifies the at least one electronic device as an unwanted electronic device when the received behavior does not match any normal behavior patters or when the received behavior matches a known abnormal behavior pattern.

In one embodiment, behavior receive module 232 can therefore, apart from receiving a spectral signature from a sensing device (as explained with reference to FIG. 2A), also receive other behavioral attributes of an electronic device (which may also be referred to herein as potential rogue device/undesired device/unwanted device/PED). Such behavioral attributes or observed behaviors can include, but are not limited to, operation of the electronic device, noise generated by the electronic device, radio frequency (RF) generated by the electronic device, electromagnetic interference (EI) generated by the electronic device, affects of the electronic device on one or more second electronic devices in proximity to the electronic device, physical persistence of the electronic device, among other like attributes. As attributes such as noise, RF, EI are specific/unique to each electronic device, comparison/assessment of such attributes against a database of corresponding values of known PEDs and/or LEDs can be used to identify whether an electronic device at issue is a PED/unwanted device. Furthermore, a physical persistence attribute can be used to determine whether a detected electronic device remains within a particular location (e.g., proximate to a gas pump) rather than being a transient presence (e.g., a mobile phone of a customer), which can therefore help in determining/evaluating whether the detected electronic device is a PED/unwanted device. Behavioral attributes of the electronic device can include assessment of, for instance, a type or types of wireless transmissions (e.g., Bluetooth, WiFi and/or cellular) being sent from the electronic device, or the frequency of such transmissions among other like parameters, evaluation of which can help confirm whether the behavior of such electronic device is normal or indicative of it being a PED/unwanted device.

In an aspect, once electronic device behavior receive module 232 identifies a particular behavior of the electronic device, behavior based matching module 234 can be used to match, based on a database storing, e.g., a baseline or normal behavior pattern of the environment being monitored, behavior patters of known harmless electronic devices and/or behavior patterns of known PEDs, the received behavior with the stored patterns. Such a database can either be part of system 230 or can be operatively coupled thereto or otherwise accessible via a communication network. In an aspect, the database can include multiple fields, e.g., unique identifiers, descriptions, RF values, EI values, noise characteristics/values, location coordinates, among other characteristics and/or behavior attribute values for respective known LEDs and/or PEDs.

In an aspect, unwanted electronic device classification module 236 can be configured to classify the electronic device as an unwanted electronic device when the received behavior does not match stored normal behavior patterns or when the received behavior matches a behavioral pattern of a known PED. In an implementation in which the database has stored therein behavioral attributes of LEDs, therefore, when observed values for one or more behavior attributes of the potential parasitic electronic device do not match with corresponding attribute values of one of the LEDs, a conclusion can be made that the potential parasitic electronic device under test is actually a PED/unwanted device. Those skilled in the art will appreciate that such behavioral pattern matching may be performed using various weightings (e.g., some attributes may have more or less importance than others) and/or thresholds (e.g., some attributes may require more or less precise matching than others) applied at the behavior attribute level or as a whole to allow the matching to be customized and/or tuned as desired for the particular implementation and/or environment In an aspect, behavioral analysis of an electronic device can take into consideration a number of other factors, including, but not limited to, any or a combination of time, location, periodicity, related-signals that add dimensionality to Fourier and other transforms that may be used and may even involve applying chaos mathematical methods to determine periodicities that are not exactly static. Additional methods of characterizing signals may rely on examining signal by-products of electronic components that produce them. For instance, a low cost portable "stingray" rogue cellular "tower" has a dimension of spatial/proximal anomaly, and likely also has signal generation characteristics that may be seen by examining non-transformed signal for transmitter artifacts (signal attack/decay, waveform anomalies) and transformed artifacts (simultaneous harmonics, spurious transmissions).

In another aspect, it is to be appreciated that an aspect of the present invention involves monitoring one or more electronic device(s) to make sure that a parasitic device has not been attached to it/them. Although, proximity is relative as once this detection capability is there, ability to detect local area parasitic devices is then in place. Therefore, the proposed detection-device/system-on-chip (SOC)/sensing device may be mounted as a component or add-on to a manufactured device that must remain secure, and/or we can augment with or use an external device that does spectral and wireless protocol specific analysis.

Turning to FIG. 2C, in an aspect, system 260 includes a spectral/RF characteristics based signal receive module 262 that can be configured to receive a signal that is representative of spectral or RF characteristics of an electronic device environment having one or more electronic devices; a spectral/RF characteristics signal processing module 264 that can be configured to process and evaluate the received signal to determine whether the spectral or RF characteristics are indicative of normal or abnormal spectral or RF characteristics of the electronic device environment; and an unwanted device presence confirmation module 266 that can be configured to confirm that the electronic device environment includes an unwanted electronic device when it is determined that the spectral or RF characteristics are consistent with normal spectral or RF characteristics of the electronic device environment or are indicative of spectral or RF characteristics of a known PED.

Depending upon the particular implementation, spectral/RF characteristics based signal receive module 262 may be configured to request a sensing device to capture a signal representative of spectral or RF characteristics of the entire electronic device environment or a signal representative of spectral or RF characteristics of a particular electronic device within the environment.

Spectral/RF characteristics signal processing module 264 can be configured to process and evaluate the received signal to determine whether the spectral or RF characteristics are indicative of normal spectral/RF characteristics of the electronic device environment, which may be learned or captured during a training phase of system 260. Such normal spectral/RF characteristics can also be stored, for instance, as values, ranges or signatures in a database. In some embodiments, therefore, system 260 can be trained with multiple/different electronic device environments having only known LEDs so as to understand what value ranges can be indicative of normal spectral/RF characteristics. Additionally or alternatively, system 260 can be trained by exposing it to known PEDs. Such training can be continuously supplemented with real-time learning and/or administrator feedback so as to enhance the detection ability of system 260 with respect to ranges of normalcy to be expected and/or types of PEDs that can be detected.

In an aspect, unwanted device presence confirmation module 266 can be configured to confirm the electronic device environment includes an unwanted electronic device based on the stored spectral/RF characteristics/signatures. For example, in one embodiment, an unwanted electronic device may be identified within the electronic device environment when it is determined that the spectral or RF characteristics are not indicative of normal spectral or RF characteristics of the electronic device environment. Alternatively, an unwanted electronic device may be identified within the electronic device environment, when the observed spectral or RF characteristics are consistent with the presence of a spectral/RF signature of a known PED. In one embodiment, the unwanted device detection module 266 can further be configured to analyze the spectral or RF characteristics of the received signal so as to determine and locate the unwanted electronic device that is causing deviation from the normal spectral or RF characteristics of the electronic device environment. For instance, in an exemplary implementation, module 266 can subtract from the captured signal the known spectral or RF characteristics of each electronic device that is known to form part of the electronic device environment one by one or as a whole and then reevaluate the remaining spectral or RF characteristics to confirm whether such remaining characteristics are indicative of the presence of a PED.

In an aspect, once the unwanted electronic device is identified, spectral or RF characteristics thereof can be learned and stored by system 260 so as to allow the spectral signature to be subsequently identified as a PED.

In an aspect, system 260 can be configured to detect persistent presence (physical presence over a predetermined or configurable duration of time) of an unwanted electronic device that was not present within the electronic device environment when the normal spectral or RF characteristics were learned during a training phase. In another aspect, the normal spectral or RF characteristics of the electronic device environment can be constructed and updated based on learning of how the spectral or RF behavior of each desired electronic device of the one or more electronic devices changes over time. Those skilled in the art will appreciate that different types of spectral or RF characteristics can also be classified for different corresponding types of electronic device environments, and wherein during normal evaluation, an environment type of the environment under test can first be determined, based on which a comparison can be made between the spectral or RF characteristics of the environment under test and the known spectral or RF characteristics corresponding to the baseline or normal environment to confirm normalcy or identify an abnormality.

The normal spectral or RF characteristics can be represented as one or more patterns that are indicative of the electronic device environment without existence of an unwanted electronic device. Such patterns can be, for instance, trends or indicators of a controlled environment or situation during which it is known that no unwanted electronic device is present in the environment. Such patterns can also be stored in the form of one or more libraries, which can be referred to and accessed when spectral or RF characteristics of a particular environment need to be evaluated to confirm whether the pattern(s) being demonstrated by the spectral or RF characteristics are indicative of normal behavior.

In an aspect, a PED can be detected using one or more of a variety of sensing devices by feeding into a signature/behavioral database for real-time analysis, alerting and device type learning. Sensing devices (which may also be referred to herein as detectors) can include vibrational/audible, capacitive, inductive, resistive, photon/light-spectrum, SDR/RF/radio spectrum.

In an aspect, signals received from one or more potential PEDs can be analyzed, which analysis can cover real-time signal characteristics at a point in time along with characteristics over various timeframes including fractions of a second up to days, weeks, or even months or longer as needed to determine parasitic activity. An advantage of the methodologies described herein is that multiple modes of operation of the protected device may be characterized and device failure and anomalous behavior may be detected passively by the sensing device/detector. In an aspect, using signal processing and common noise elimination algorithms, system 260 can allow for sampling and creation of signatures for most common types of electronic storage, computing, transmitting, receiving, analog and other devices in use, allowing for determination of likely types of PEDs in proximity to a protected device or environment.

Aspects of the present disclosure can also provide tamper-protection, RF-EMI signal acquisition, light change detection, among other like features so as to protect larger devices. Environments in which embodiments of the present invention may be used and applications of the present disclosure can include, but are not limited to, electronic devices such as ATMs/kiosk systems, point of sale systems, card readers, fuel pumps, boardrooms, secure meeting facilities, and secure personal computing or electronic devices.

Figure 3A:
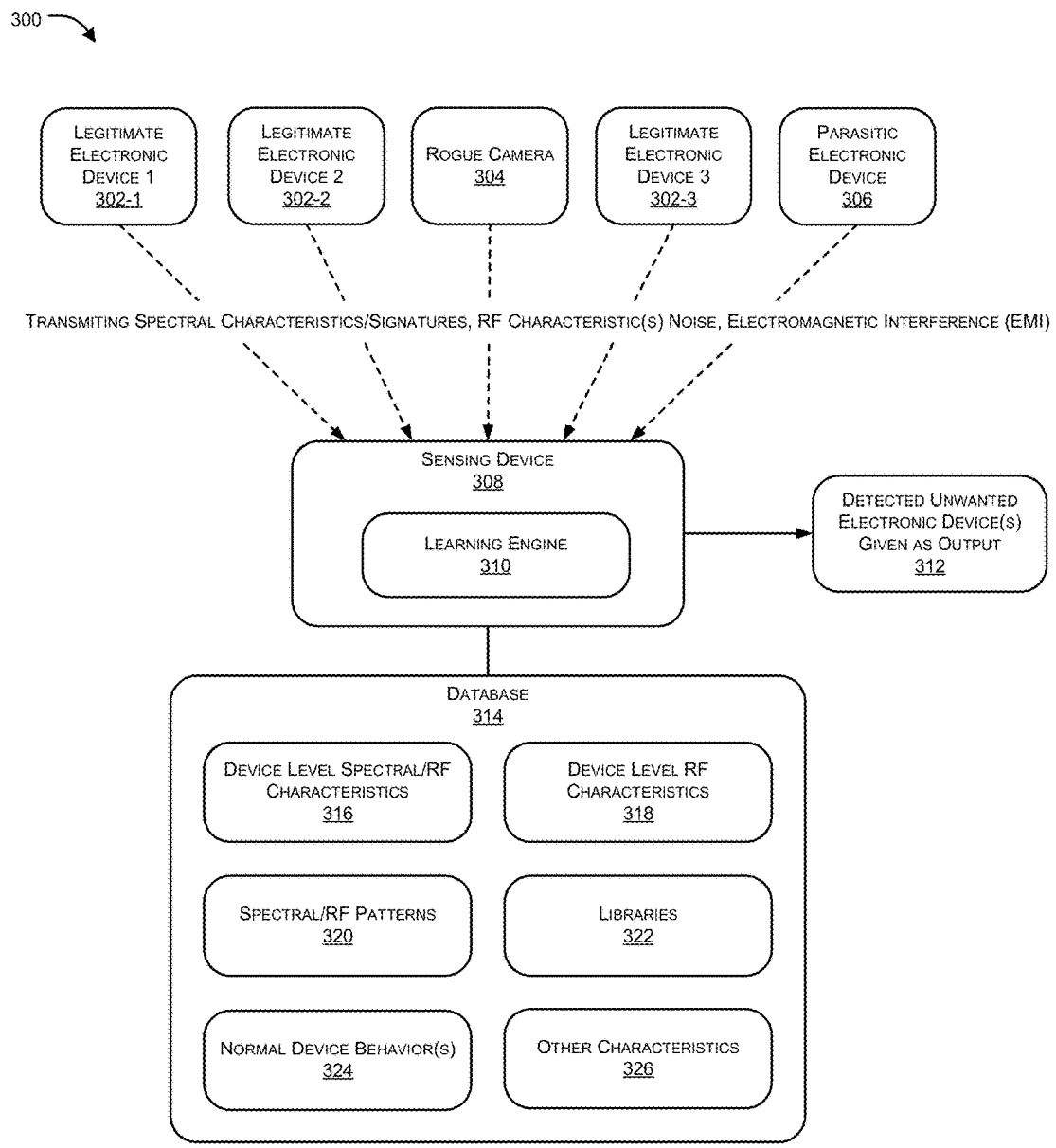
FIGS. 3A and 3B illustrate exemplary diagrams showing detection of PEDs in an electronic device environment by means of a sensing/monitoring device in accordance with an embodiment of the present invention.
Figure 3B:
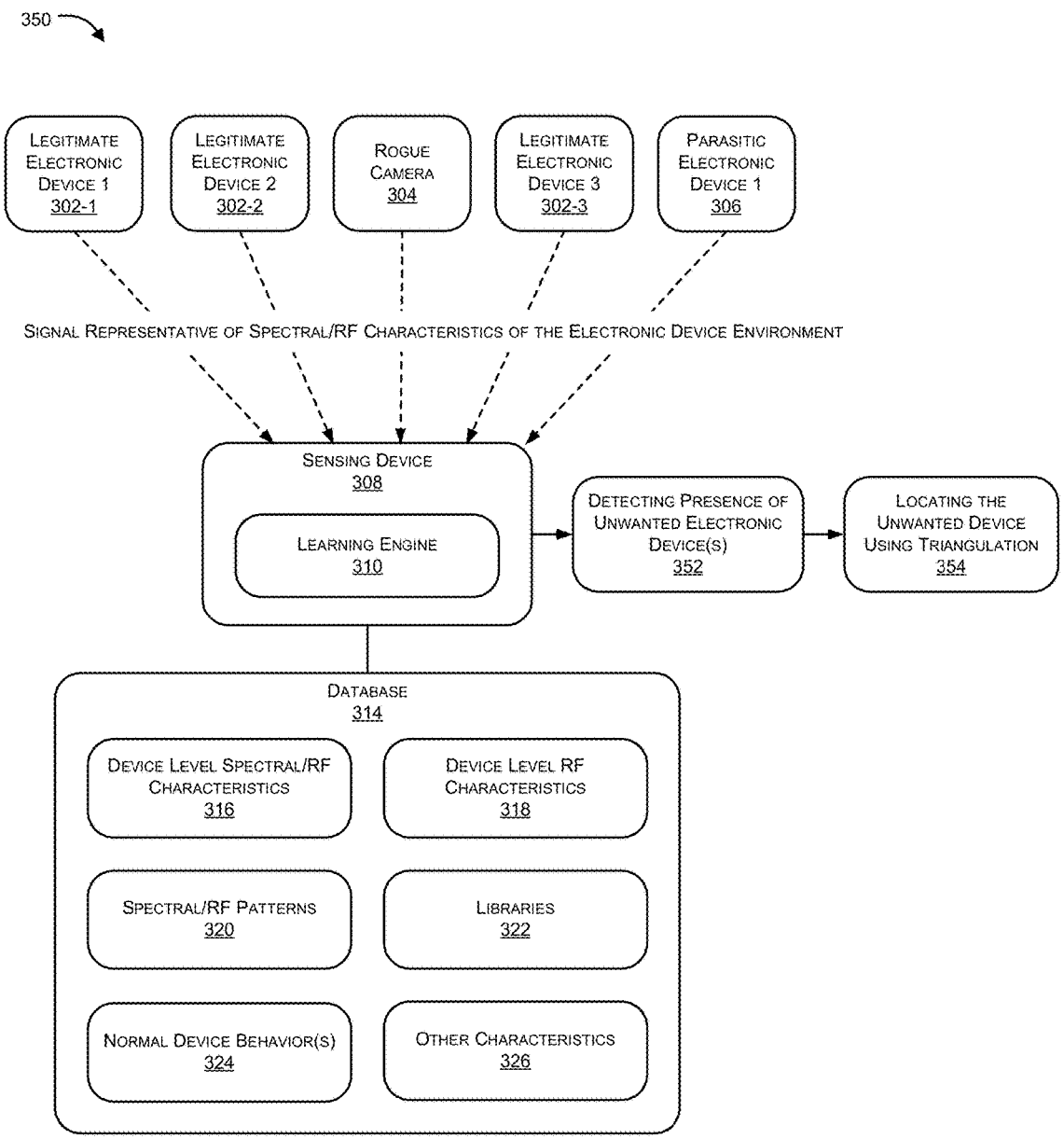

FIGS. 3A and 3B illustrate exemplary diagrams showing detection of PEDs in an electronic device environment by means of a sensing/monitoring device 308 in accordance with an embodiment of the present invention. With respect to FIG. 3A, as can be seen, an electronic device environment can include one or more LEDs 302, a first PED such as a rogue camera 304, and a second PED 306. Each or a combination of such electronic devices can, in real-time or at regular/periodic intervals, produce/emit any or a combination of spectral characteristics/signature(s), RF characteristics, EI characteristics, noise attributes (all of which may be collectively referred to as device level information (DLI)). Such DLI can then be received a sensing device 308. Such a sensing device 308 can be selected from any or a combination of a sensor, a computing device comprising the sensor, a vibration/audio detector, a noise detector, a capacitive detector, an inductive detector, a resistive detector, a photon/light spectrum detector, a software defined radio (SDR) detector, a radio frequency detector, a spectrum analyzer, a radio spectrum detector, a network security device, and an access point.

In an exemplary implementation, upon receipt of DLI from a potential PED, the sensing device 308 can retrieve corresponding information attribute values pertaining to known LEDs and/or PEDs from a database 314 that the device 308 is operatively coupled to. For instance, the database 314 can store, for one or more LEDs and PEDs, their respective spectral/RF characteristics 316, RF characteristics 318, EI values (not shown), spectral/RF patterns 320, libraries 322 that based on spectral/RF patterns, normal device behavior attribute values 324, along with values of other characteristics 326. Based a comparison between the DLI received from a potential PED and the corresponding information attribute values stored in the database 314, device 308 can detect, at 312, whether the potential PED is actually a PED/unwanted device and notify an administrator of the electronic device environment regarding same to allow the administrator to take appropriate measures.

Sensing device 308 includes a learning engine 310 that can be trained in advance of being placed into the electronic device environment to be protected to recognize behavior/spectral or RF characteristics of known PEDs and/or learn behavior/spectral or RF characteristics of one or more confirmed PEDs while operating within the electronic device environment so that similar PEDs can be more efficiently, effectively and speedily detected by learning engine 310. Learned behavior/spectral or RF characteristics of one or more identified PEDs can also be stored in the database 314 or in a different database that stores characteristic values for identified/classified PEDs.

FIG. 3B shows another exemplary implementation in which a signal that is representative of spectral/RF characteristics of the complete (or a part thereof) electronic device environment is received by sensing device 308. In such a case therefore, instead of receiving spectral/RF characteristics or noise/EI values for each electronic device, the received signal is representative of the complete environment having one or more LEDs as well as at least one potential PED, or the signal is representative of a group of LEDs and at least one potential PED. Spectral/RF characteristics indicated by the signal can then be evaluated with respect to corresponding characteristics that are indicative of a normal environment such that if the deviation between the two is greater than a defined threshold, presence of at least one PED can be confirmed at 352. Subsequent to such confirmation, the location of the unwanted device can then be determined at 354 based on techniques such as triangulation, or by iteratively/slightly changing the instant electronic device environment one or more times to detect which electronic device may be causing the detected deviation from the baseline or normal spectral/RF characteristics.

Figure 4A:
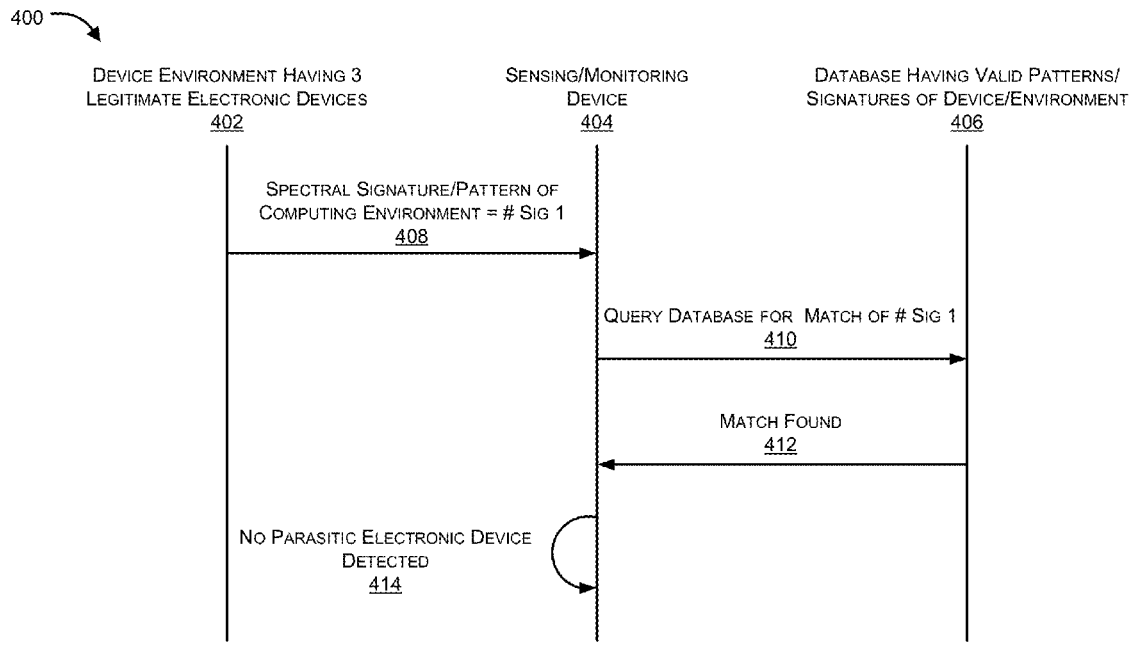
FIGS. 4A and 4B illustrate exemplary diagrams showing detection of PEDs in an electronic device environment by means of a sensing/monitoring device in accordance with an embodiment of the present invention.
Figure 4B:
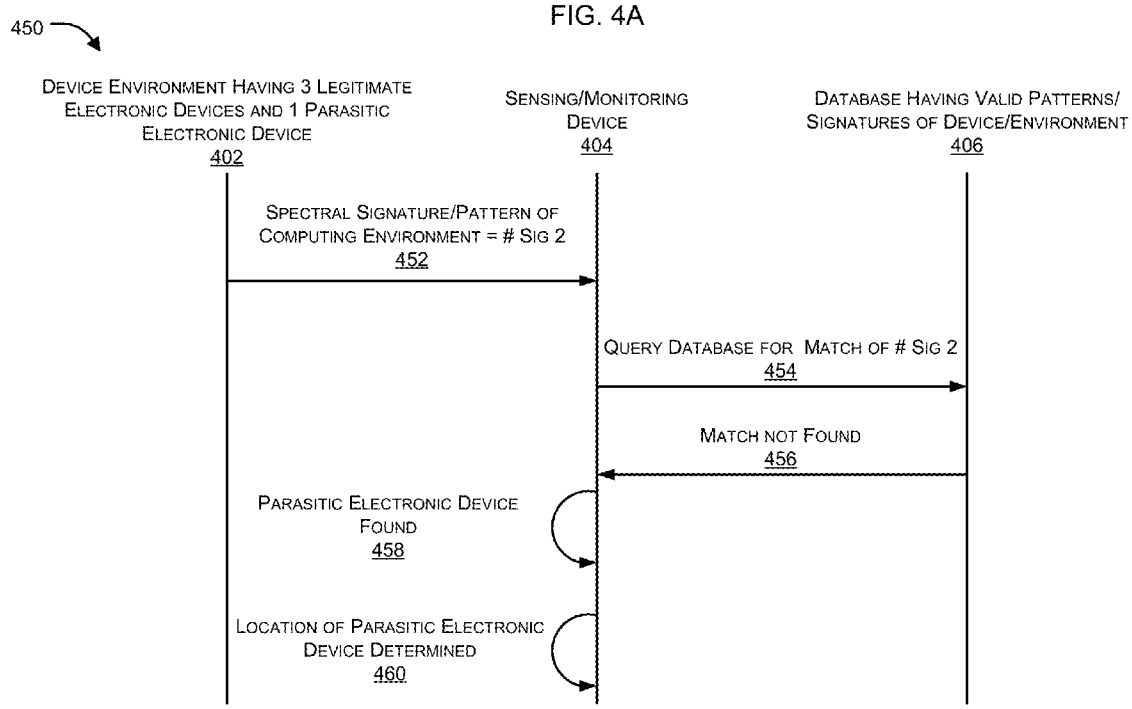

FIGS. 4A and 4B illustrate exemplary diagrams showing monitoring for the existence of PEDs in electronic device environments 400 and 450 by means of a sensing/monitoring device in accordance with an embodiment of the present invention. In the context of electronic device environment 400, it includes three LEDs 402, wherein, at step 408, the spectral signature of electronic device environment 400 #SIG_1 (which may also interchangeably be referred to as pattern or characteristic) may be captured by a sensing device 404 (which may also interchangeably be referred to as a monitoring device). Based on the receipt of spectral signature from environment 402, sensing device 404 can query 410 a database 406 that stores one or more valid patterns/signatures of different device environment configurations, wherein the query 410 can be to check if the received spectral signature has a match (complete or partial, say with respect to a defined threshold) in the database 406. The database 406, in the example of the present scenario, can confirm to sensing device 404, through step 412, that a match has been found, in which case sensing device 404 can confirm, through message 414, that no PED has been detected.

On the other hand, in the context of electronic device environment 450, when a PED is present within the same device environment 402, a different spectral/RF signature/pattern/characteristic #SIG_2 is captured (at step 452) by the sensing device 404, based on which a query 454 is issued by device 404 to confirm whether a match is found. In this scenario, database 406 does not find a match as it only stores spectral/RF signatures for environments having only LEDs, and accordingly returns a message 456 indicating that a match was not found, based on which sensing device 404 can confirm, through message 458, that a PED exists in the environment and make attempts, through message 460, to locate the PED. Detection of the PED can of course be intimated to one or more emergency response teams or network security elements.

Figure 5:
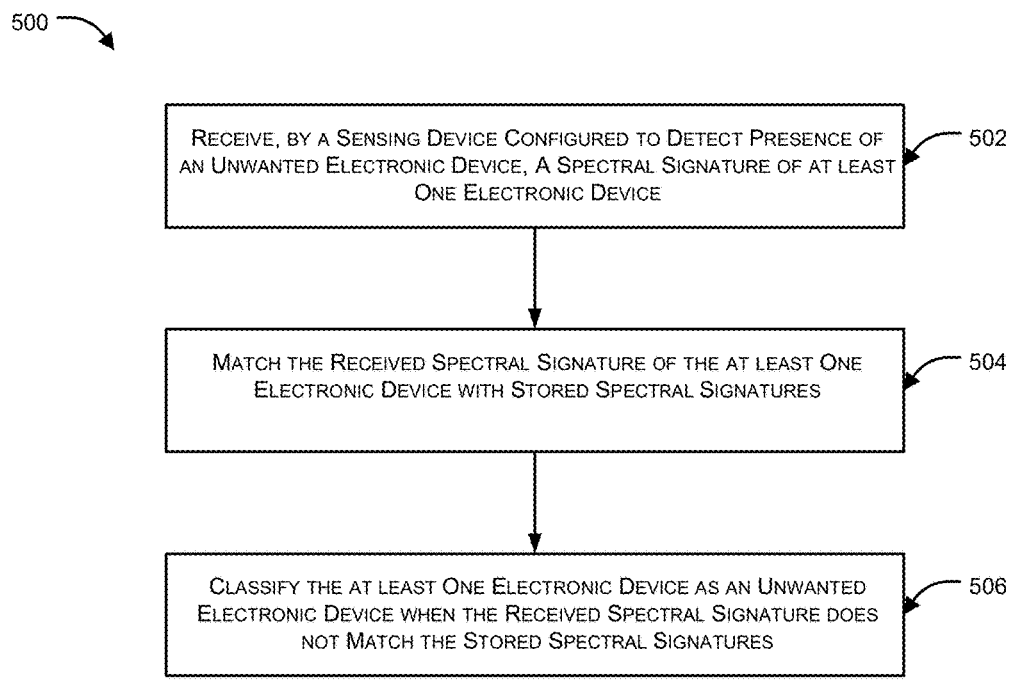
FIG. 5 is a flow diagram illustrating detection of a PED based on its spectral signature in accordance with an embodiment of the present invention.

FIG. 5 is a flow diagram 500 illustrating detection of a PED based on its spectral signature in accordance with an embodiment of the present invention. In the present example, at step 502, a spectral signature of at least one electronic device within an electronic device environment is received by a sensing device that is configured to detect the presence of an unwanted electronic device.

At step 504, the received spectral signature is matched, using a database operatively coupled with the sensing device and storing multiple spectral signatures of one or more known electronic devices, against the stored spectral signatures.

At step 506, the at least one electronic device is classified, using the sensing device, as the unwanted electronic device when the received spectral signature does not match any of the stored spectral signatures.

In an aspect, the sensing device can be any or a combination of a sensor, a computing device comprising the sensor, a vibration/audio detector, a noise detector, a capacitive detector, an inductive detector, a resistive detector, a photon/light spectrum detector, a software defined radio (SDR) detector, a radio frequency detector, a spectrum analyzer, a radio spectrum detector, a network security device, and an access point.

In another aspect, the unwanted electronic device can be any or a combination of a skimmer, a passive sniffing device, an overlap keypad, a rogue computing device, a rogue video recording device, and a rogue audio recording device.

While in the context of the present example, the database against which the spectral signature is matched includes spectral signatures of known LEDs, in other embodiments, the database may additionally or alternatively contain spectral signatures of known PEDs. In such an implementation, a match between the captured spectral signature and a spectral signature of a known PED would be indicative of the presence of a PED within the electronic device environment at issue.

Figure 6:
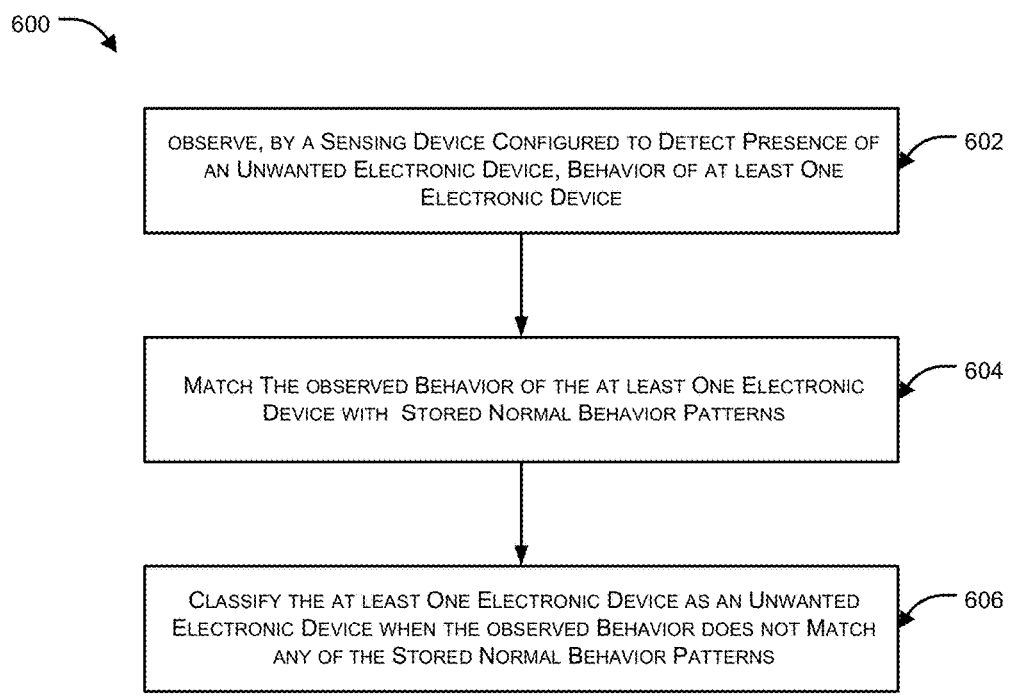
FIG. 6 is a flow diagram illustrating detection of a PED based on its behavior in accordance with an embodiment of the present invention.

FIG. 6 is a flow diagram 600 illustrating detection of a PED based on its behavior in accordance with an embodiment of the present invention. In the present example, at step 602, a sensing device configured to detect presence of an unwanted electronic device, observes the behavior of at least one electronic device.

At step 604, the observed behavior is matched, using a database operatively coupled with the sensing device and storing one or more samples of normal behavior patterns of one or more electronic devices, against the stored normal behavior patterns.

At step 606, the at least one electronic device is classified as being an unwanted electronic device when the observed behavior does not match any of the stored normal behavior patterns.

In an aspect, the behavior of at least one electronic device can be obtained based on any or a combination of operation of the at least one electronic device, including, but not limited to, noise generated by the at least one electronic device, radio frequency generated by the at least one electronic device, electromagnetic interference generated by the at least one electronic device, an effect created by the at least one electronic device on at least a second electronic device, and physical persistence of the at least one electronic device.

While in the context of the present example, the database against which the observed behavior is matched includes normal behavior patterns or behavior patters expected to be observed within the electronic device environment in the absence of a PED, in other embodiments, the database may additionally or alternatively contain behavior patters of known PEDs. In such an implementation, a match between the observed behavior and a behavior pattern of a known PED would be indicative of the presence of a PED within the electronic device environment at issue.

Figure 7:
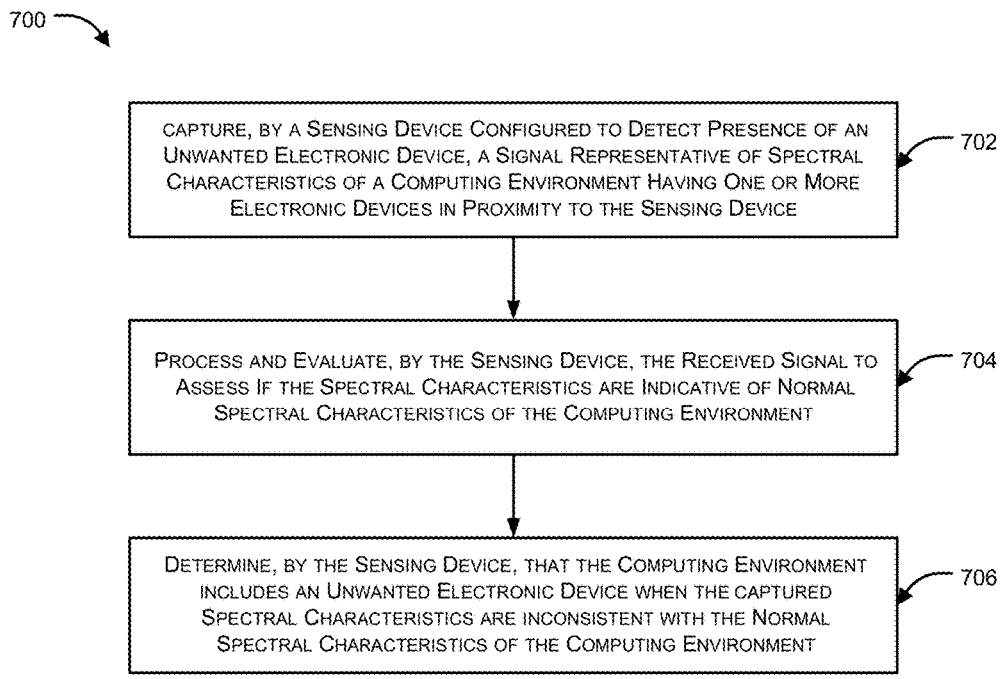
FIG. 7 is a flow diagram illustrating detection of a PED based on evaluation of normalcy of spectral/RF characteristic of electronic device environment in accordance with an embodiment of the present invention.

FIG. 7 is a flow diagram 700 illustrating detection of a PED based on evaluation of normalcy of spectral/RF characteristic of electronic device environment in accordance with an embodiment of the present invention. In the present example, at step 702, a signal representative of spectral or RF characteristics of a electronic device environment is captured by a sensing device configured to detect presence of an unwanted electronic device.

At step 704, the received signal is processed and evaluated by the sensing device to determine whether the spectral or RF characteristics are indicative of normal or baseline spectral or RF characteristics of the electronic device environment.

At step 706, the sensing device determines that the electronic device environment includes an unwanted electronic device when the captured spectral or RF characteristics are inconsistent with the normal spectral or RF characteristics of the electronic device environment.

Figure 8A:
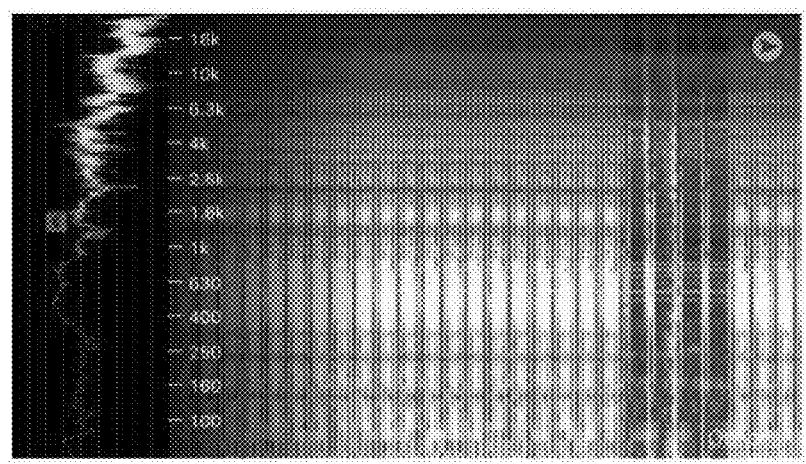
FIGS. 8A and 8B illustrate how outputs of spectral signatures/patterns of ED(s) can be used to detect whether such ED(s) are PED(s).
Figure 8B:
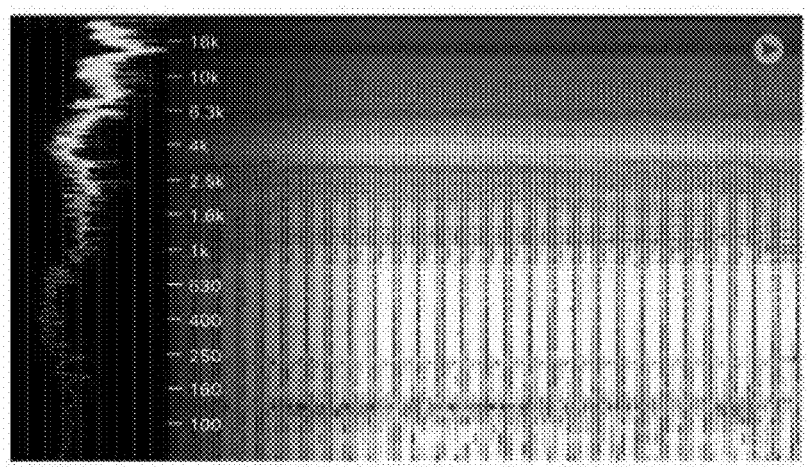

FIGS. 8A and 8B illustrate how outputs of spectral signatures/patterns of ED(s) can be used to detect whether such ED(s) are PED(s). FIG. 8A illustrates a 20 KHz spectral Fast Fourier Transform (FFT) of an audio encoding of electromagnetic signals emitted from a normally operating proximity or RFID card reader, wherein 4 pulse interruptions are issued when a compatible proximity or RFID card is in proximity to the card reader and activated. The sensing device in such an environment can, for instance, be an inductive pickup tool (e.g., a telephone tone signal detector—Harris Pro2000 Probe) with crude audio coupling to a smart phone using an application/app such as Spectrogram Pro v3.0.

FIG. 8B, on the other hand, shows use of the same proximity card reader with a smart phone in contact with the proximity card reader to illustrate the significant difference in the 4K band resulting from the presence of the smart phone. In this example, the newest signal comes in from the right of the FFT and the image encompasses 12 seconds of sample data with the oldest signal on the left and real-time in the green waveform on the left.

Figure 9:
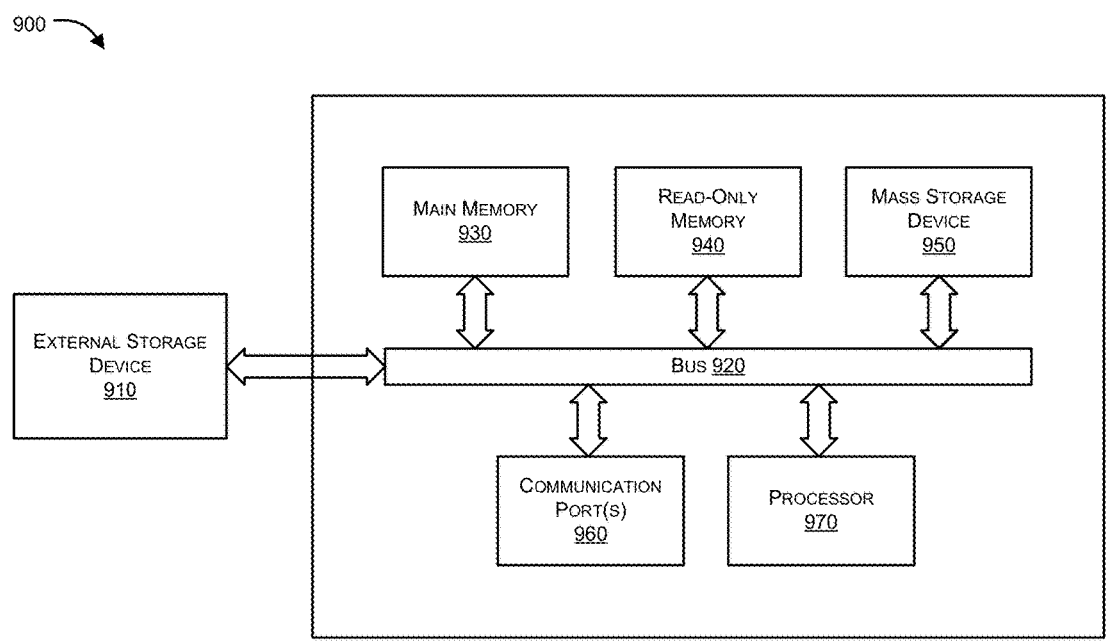
FIG. 9 illustrates an exemplary computer system in which or with which embodiments of the present invention may be utilized.

FIG. 9 illustrates an exemplary computer system in which or with which embodiments of the present invention may be utilized.

In an embodiment, monitoring of an electronic device environment for the existence of a PED can be performed by computer system 900. Computer system 900 may represent a sensing device (e.g., sensing device 308 or 404), a learning engine (e.g., learning engine 310) or a computing device with which the sensing device and/or the learning engine interact. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

In the context of the present example, computer system 900 includes an external storage device 910, a bus 920, a main memory 930, a read only memory 940, a mass storage device 950, communication port 960, and a processor 970. Those skilled in the art will appreciate that computer system 900 may include more than one processor and communication ports.

Examples of processor 970 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 970 may include various modules associated with embodiments of the present invention.

Communication port 960 can be any of an RS-232 port for use with a modem based dialup connection, a 10/100 Ethernet port, a Gigabit or 10 Gigabit port using copper or fiber, a serial port, a parallel port, or other existing or future ports. Communication port 960 may be chosen depending on a network, such a Local Area Network (LAN), Wide Area Network (WAN), or any network to which computer system 900 connects.

Memory 930 can be Random Access Memory (RAM), or any other dynamic storage device commonly known in the art. Read only memory 940 can be any static storage device(s) e.g., but not limited to, a Programmable Read Only Memory (PROM) chips for storing static information e.g., start-up or BIOS instructions for processor 970.

Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 970 to software system.

Optionally, operator and administrative interfaces, e.g. a display, keyboard, and a cursor control device, may also be coupled to bus 920 to support direct operator interaction with computer system 900. Other operator and administrative interfaces can be provided through network connections connected through communication port 960.

External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A payment or transaction terminal comprising:
   a card reader;
   a keypad; and
   an integrated sensing system including:
      a sensing device in a form of one or more of a noise detector and a radio frequency detector, the sensing device configured to capture spectral characteristics of electronic devices contained within and proximate to the payment or transaction terminal;
      a wireless protocol analyzer configured to detect use of one or more wireless protocols;
      a non-transitory storage device having embodied therein one or more routines; and
      one or more processors coupled to the non-transitory storage device and operable to execute the one or more routines to perform a method comprising:
         during a training mode when the payment or transaction terminal is in a controlled environment known to exclude potential out-of-band data extrusion devices, learning normal spectral characteristics associated with the payment or transaction terminal by:
            receiving from the sensing device one or more training samples in a form of the spectral characteristics captured during the training mode;
            identifying one or more training samples as the normal spectral characteristics; and
            storing the normal spectral characteristics in a database;
         during a detection mode when the payment or transaction terminal mode has been deployed within an environment in which the payment or transaction terminal is to be protected:
            receiving from the sensing device the spectral characteristics;
            receiving from the wireless protocol analyzer an indication regarding the use of the one or more wireless protocols;
            making a first determination regarding whether the received spectral characteristics include a spectral characteristic indicative of existence of a potential out-of-band data extrusion device proximate to the payment or transaction terminal by:
               comparing the received spectral characteristic to the normal spectral characteristics, wherein the spectral characteristic includes one or more of noise and electromagnetic interference emitted by the potential out-of-band data extrusion device; and
               confirming the received spectral characteristic persists for greater than a predetermined threshold;
            when said first determination is affirmative then logging existence of the potential out-of-band data extrusion device;
            making a second determination regarding whether the use of the one or more wireless protocols persists for greater than the predetermined threshold; and
            when said second determination is affirmative then logging existence of the potential out-of-band data extrusion device.

2. The payment or transaction terminal of claim 1, wherein the payment or transaction terminal comprises an Automated Teller Machine (ATM).

3. The payment or transaction terminal of claim 1, wherein the payment or transaction terminal comprises a gas pump.

4. The payment or transaction terminal of claim 1, wherein the payment or transaction terminal comprises a point of sale system.

5. The payment or transaction terminal of claim 1, wherein the payment or transaction terminal comprises a parking meter or a parking lot kiosk.

6. The payment or transaction terminal of claim 1, wherein the payment or transaction terminal comprises a vending machine.

7. The payment or transaction terminal of claim 1, wherein the potential out-of-band data extrusion device comprises a card skimmer.

8. The payment or transaction terminal of claim 1, wherein the potential out-of-band data extrusion device comprises a passive sniffing device.

9. The payment or transaction terminal of claim 1, wherein the potential out-of-band data extrusion device comprises an audio recording device or a video recording device.

10. The payment or transaction terminal of claim 1, wherein the potential out-of-band data extrusion device comprises an overlay keypad.

11. The payment or transaction terminal of claim 1, wherein the integrated sensing system further includes one or more of a vibration/audio detector, a capacitive detector, an inductive detector, a resistive detector, a photon/light spectrum detector, a software defined radio (SDR) detector, a spectrum analyzer, a radio spectrum detector, a network security device, and an access point.

12. The payment or transaction terminal of claim 1, wherein the wireless protocol analyzer is implemented within a network security device.

13. The payment or transaction terminal of claim 1, wherein the one or more wireless protocols include Bluetooth.

14. The payment or transaction terminal of claim 1, wherein the one or more wireless protocols include WiFi.

15. The payment or transaction terminal of claim 1, wherein the one or more wireless protocols include a cellular communication protocol.

* * * * *